Figure 1:
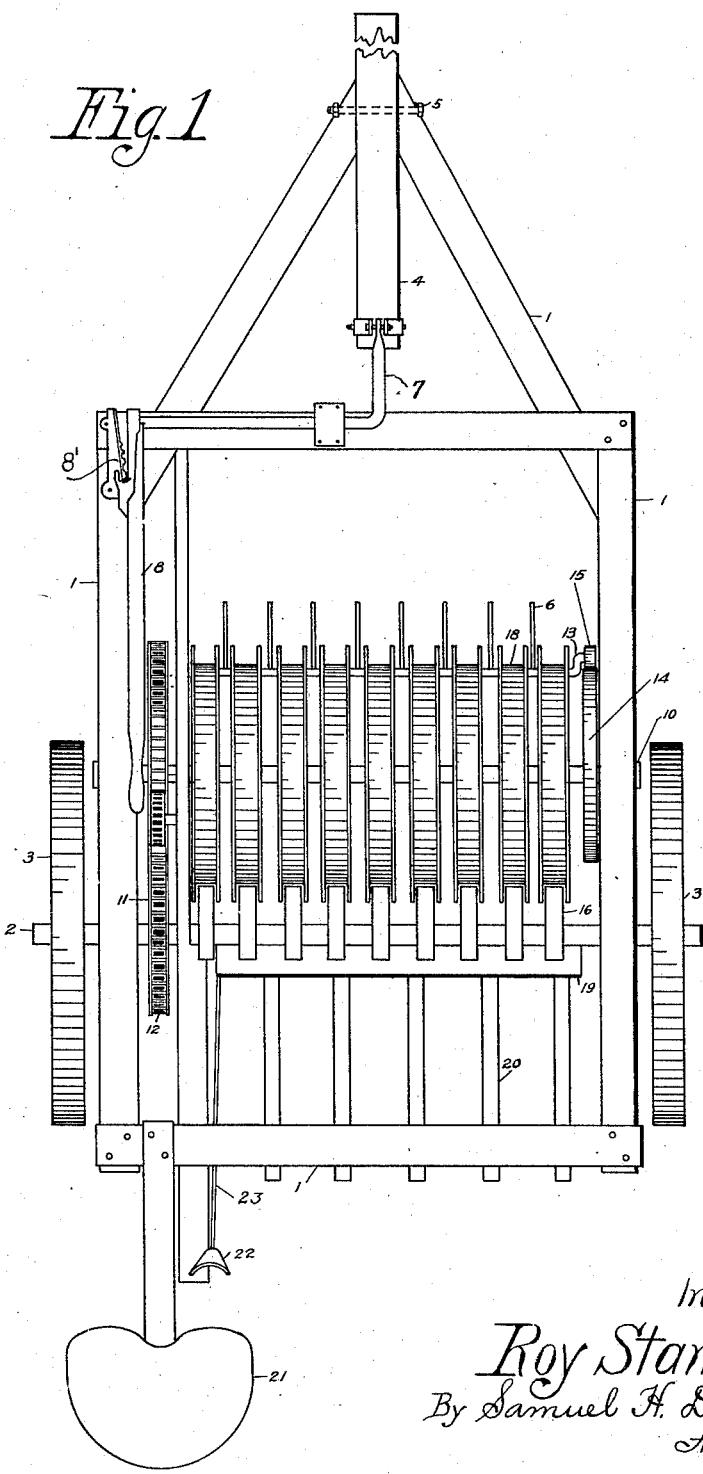

April 15, 1930.  R. STAMPFLY  1,754,337
BEAN RAKE AND BUNCHER
Filed Feb. 14, 1927  2 Sheets-Sheet 1

Inventor
Roy Stampfly,
By Samuel H. Davis,
Attorney.

April 15, 1930. R. STAMPFLY 1,754,337
BEAN RAKE AND BUNCHER
Filed Feb. 14, 1927 2 Sheets-Sheet 2
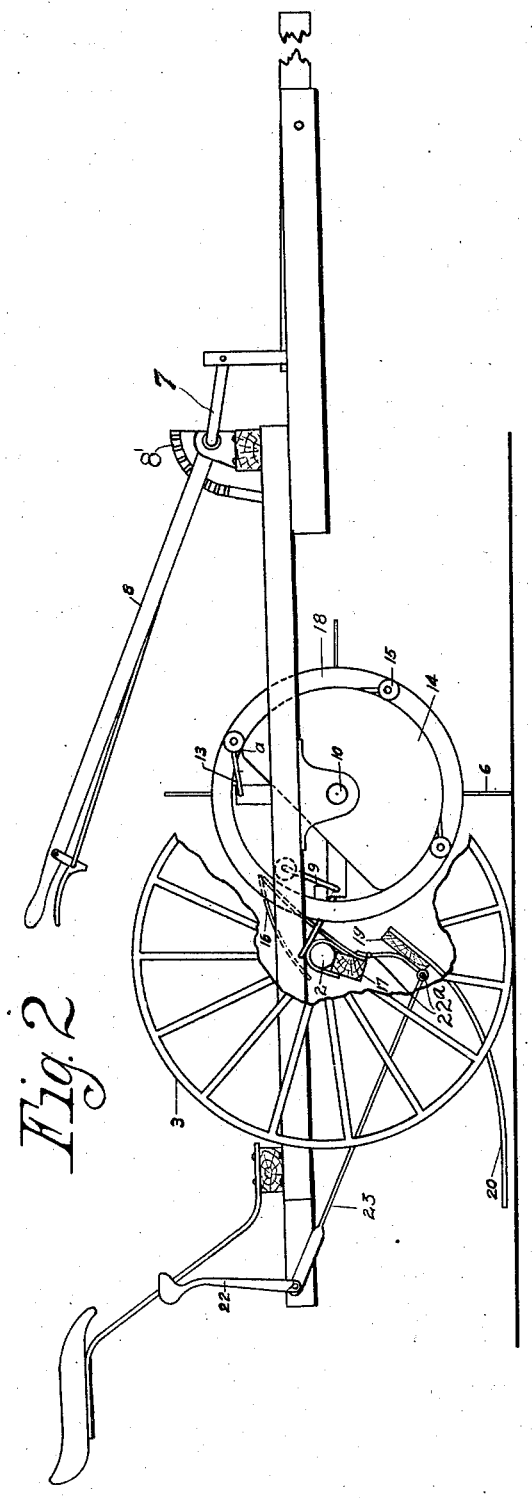
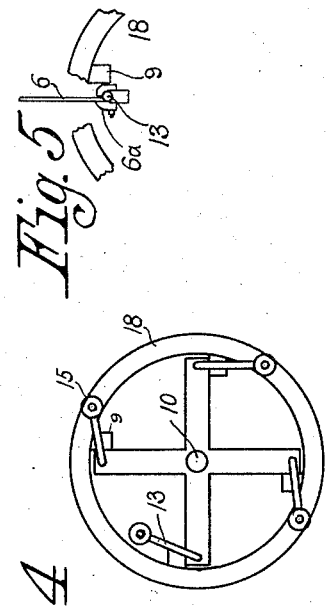
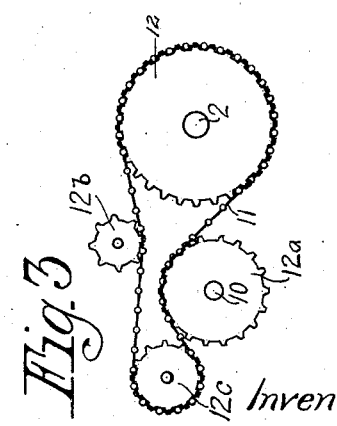
Inventor
Roy Stampfly,
By Samuel H. Davis.
Attorney.

Patented Apr. 15, 1930

1,754,337

UNITED STATES PATENT OFFICE

ROY STAMPFLY, OF LANSING, MICHIGAN

BEAN RAKE AND BUNCHER

Application filed February 14, 1927. Serial No. 168,126.

This invention relates to bean rakes and bunchers or the like for gathering into bunches vines of any description previously cut and lying upon the ground.

This applicant is aware that prior to his present invention various types and constructions of rakes and tedders have been made many of which are adapted for use in raking and bunching bean vines, and he does not claim such harvesters broadly. His invention consists in the special construction and arrangement of parts herein set forth which he has found to be particularly easy to manufacture and to maintain in good order, and which is unusually effective for the purpose stated.

In the accompanying drawings forming a part of this application, Fig. 1 represents a plan view of all the parts assembled. Fig. 2 is a side view. Fig. 3 is a side view of the chain and gearing arrangement. Fig. 4 is an end view of the flanged cylinder and rake teeth thereon. Fig. 5 is a fragmentary view showing one manner of connecting the teeth to the cylinder.

Throughout the drawings and description the same number is used to refer to the same part.

Considering the drawings, a frame 1 has an axle 2 upon which are wheels 3 by which the frame is movably carried, and the frame has a tongue 4 attached by a tongue bolt 5 to which draught animals may be hitched in the customary manner.

The tongue 4 is pivotally attached to the crank rod 7 transversely extending as shown, and a lever 8 is provided to raise and lower wheeled and pivotal frame 1, as best illustrated in Fig. 2. A shaft 10 is borne transversely by the main frame 1. As best shown in Figs. 1 and 3 a chain 11 drives the gears 12, 12$^a$, 12$^b$ and 12$^c$. Gear 12 is attached to the axle 2, and gear 12$^a$ to the transverse shaft 10.

As shown in Figs. 4 and 5 there are provided a number of revoluble crank rods such as rod 13 at the end of which is a roller 15 arranged to follow the peripheral track of a stationary cam 14 supported by the frame 9 and shown in Fig. 2.

At the rear in Figs. 1 and 2 will be noted V-shaped irons 16 supported upon a transverse beam 17 carried by the main axle 2. The irons 16 extend between the flanges of the members 18, which are channelled iron bands providing spaced flanges as mentioned hereinbelow. The flanged members 18 are themselves spaced apart on the shaft 10 as illustrated in Fig. 1. It will be noted here that the teeth 6 are pivotally carried by the crank rods 13 so as to project between adjacent flanges of adjacent channelled bands 18. The clamping device 6$^a$ illustrated in Fig. 5 may be used to attach the teeth to the crank rods, but this invention is not limited to the precise construction set forth in that figure. The clamping device 6$^a$ comprises as illustrated two clamping blocks secured on rod 13 by a clamping bolt and between which blocks the end of the tooth 6 is held.

At the rear of the construction constituting this invention will be noted the transverse beam 19 from which a number of curving blades side by side extend downwardly and backward. The blades are marked 20, and constitute the buncher or vine-receiving device of this invention. A driver in the seat 21 by means of a lever 22 and connecting rod 23 may tilt the dumper on the hinge 22$^a$ joining the bar 19 and the frame of the machine.

In the operation of this invention, let it be assumed that the bean vines have been mowed down and are lying upon the ground in suitable positions for gathering. The construction forming this invention is then drawn along by the tongue 4 and the rollers 15 turn the crank rods 7 and hold the teeth 6 vertically in raking position. The rollers follow the circumference of the cam 14 to raise the vines to the top of the revoluble cylinder composed of the channelled bands or flanged members 18. The vines are carried rearwardly by the revolving cylinder and are removed from the cylinder by the V-shaped irons 16. The reason for providing the channelled band construction of the revoluble cylinder will now be understood. As the irons 16 project between the flanges they must remove all the vines on the cylinder. From the irons 16 the vines fall upon the blades 20 of the dumper, and when a sufficient bunch of vines has been gathered upon the dumper it is swung downwardly by means of the lever 22 operated by the driver in seat 21, and the bunch of vines drops off the buncher all together ready to be tied or removed as a bunch. The operation is then repeated. As the teeth pass to the rear over the top, the rollers reach the flat portion of the cam 14, and the teeth are swung out of the way of beam 17 as will be readily noted in Fig. 2. It should be noted in the operation of this construction and arrangement that the tongue 4 is pivotally connected by the bolt 5 with the frame 1, and by means of the crank rod 7 and lever 8 the frame may be tilted with respect to the tongue, thus raising or lowering the cylinder comprising the annular flanged members and the rake teeth. This feature of the construction provides for moving the machine from place to place without raking, or over uneven ground.

Having now described this invention, and explained the mode of its operation, I claim:—

In a bean rake and buncher, the combination with an axle, of wheels thereon, a frame supported by the said wheels and axle, a tongue, a pivotal connection between the said frame and tongue, hand operated means for tilting the frame with respect to the tongue, a shaft carried by the frame between the said axle and the front of the frame, a cylinder borne by the said shaft and comprising spaced annular flanged members, means driven by the axle for revolving the said cylinder in a direction contrary to the direction of the revolution of the axle, rake teeth located between the flanges of adjoining annular members, revoluble crank rods carried by the said cylinder and having the said teeth attached thereto, a cam carried by the frame near the end of the cylinder, the said rods having rollers cooperating with the cam whereby the teeth are alternately radially held and released, means carried by the axle and cooperating with the said annular members to remove vines from the said cylinder, and vine receiving and dumping devices.

In testimony whereof I affix my signature.

ROY STAMPFLY.